Dec. 21, 1948.                F. E. CURTIS                2,456,928
                           LATCH OPERATED CLUTCH
Filed Dec. 4, 1944                                    5 Sheets-Sheet 1

INVENTOR
Franklin E. Curtis
By Wallace and Cannon
ATTORNEYS

Dec. 21, 1948.   F. E. CURTIS   2,456,928
LATCH OPERATED CLUTCH
Filed Dec. 4, 1944   5 Sheets-Sheet 2

INVENTOR
Franklin E. Curtis
BY Wallace and Cannon
ATTORNEYS

Dec. 21, 1948.  F. E. CURTIS  2,456,928
LATCH OPERATED CLUTCH
Filed Dec. 4, 1944  5 Sheets-Sheet 3

INVENTOR
Franklin E. Curtis
BY Wallace and Cannon
ATTORNEYS

Dec. 21, 1948.  F. E. CURTIS  2,456,928
LATCH OPERATED CLUTCH
Filed Dec. 4, 1944  5 Sheets-Sheet 4

INVENTOR
Franklin E. Curtis
BY Wallace and Cannon
ATTORNEYS

Dec. 21, 1948.  F. E. CURTIS  2,456,928
LATCH OPERATED CLUTCH
Filed Dec. 4, 1944  5 Sheets-Sheet 5

INVENTOR
Franklin E. Curtis
BY Wallace and Cannon
ATTORNEYS

Patented Dec. 21, 1948

2,456,928

UNITED STATES PATENT OFFICE 2,456,928

LATCH OPERATED CLUTCH

Franklin E. Curtis, Euclid, Ohio, assignor to Addressograph-Multigraph Corporation, Cleveland, Ohio, a corporation of Delaware Application December 4, 1944, Serial No. 566,487

9 Claims. (Cl. 192—28)

This invention relates to clutches of the positive type and particularly to such clutches that are adapted for quick-pickup operation.

Quick-pickup clutches as commercially used are in most instances of such a character as to be adapted for operation as one-revolution clutches, and since clutches of this character are engaged and disengaged quite frequently, the wear and strain upon the parts is recognized as being exceedingly great. It is therefore an important object of this invention to enable clutches of the quick-pickup type to be constructed in such a way as to insure positive pickup action and long life of the parts of the clutch. An object related to the foregoing is to enable quick-pickup clutches of the aforesaid character to be so constructed that the elements or parts thereof may be produced through the use of conventional metal working operations and machines.

A further object of the present invention is to so relate the elements of a quick-pickup clutch one to the other that the stresses encountered during the engaging movement of the parts are applied to such parts in such a manner that the stresses are distributed efficiently in such parts, thereby to avoid breakage of such parts and insure proper operation and long life of the clutch. Objects related to the foregoing are to so form and relate the parts of a quick-pickup clutch that the wearing parts of the clutch may be made from hardened metal, thereby to insure long life thereof.

Other and further objects of the present invention will be apparent from the following description and claims and are illustrated in the accompanying drawings which, by way of illustration, show a preferred embodiment and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

Figure 1:
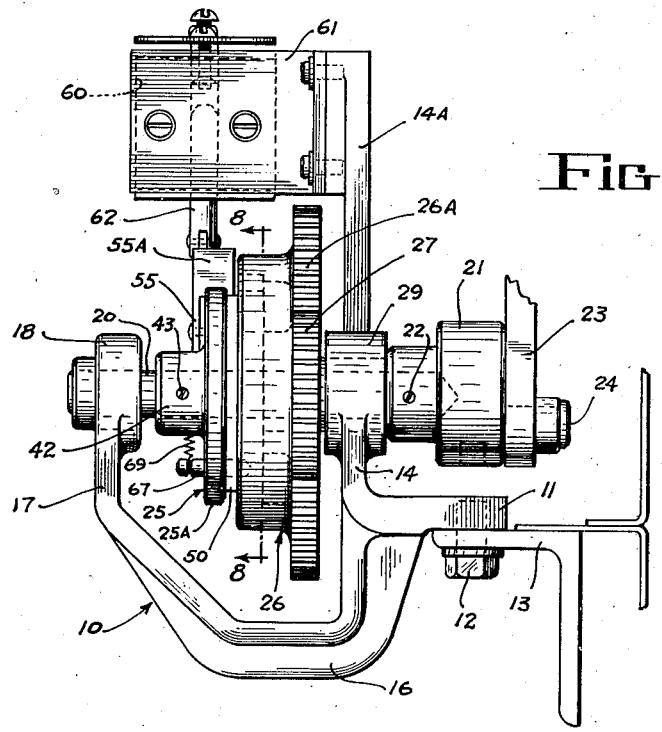
Fig. 1 is a side elevational view of a quick-pickup clutch embodying the features of the invention and adapted for use as a one-revolution clutch.

For purposes of disclosure the invention has been illustrated herein as embodied in a quick-pickup clutch 10 having a mounting bracket 11 adapted to be secured by bolts 12 on a suitable support 13 that may form a part of the machine in which the clutch 10 is to be used. The bracket 11 has an upstanding web 14 having a bearing 15 formed thereon, Fig. 3, and a U-shaped portion 16 extends downwardly from the bracket 11 and then upwardly at 17 to afford an outboard bearing 18 aligned with this bearing 15 and in which a clutch shaft 20 is supported so as to extend from the bearing 18 and through the bearing 15. The end of the shaft 20 that projects beyond the bearing 15 is in the present case utilized for connecting the clutch to the mechanism that is to be driven thereby, and in the present instance this connecting means comprises a head 21 secured by a set screw 22 on the end of the shaft 20, and a transmitting link 23 is connected to the head 21 eccentrically thereof by bearing pin 24.

Figure 2:
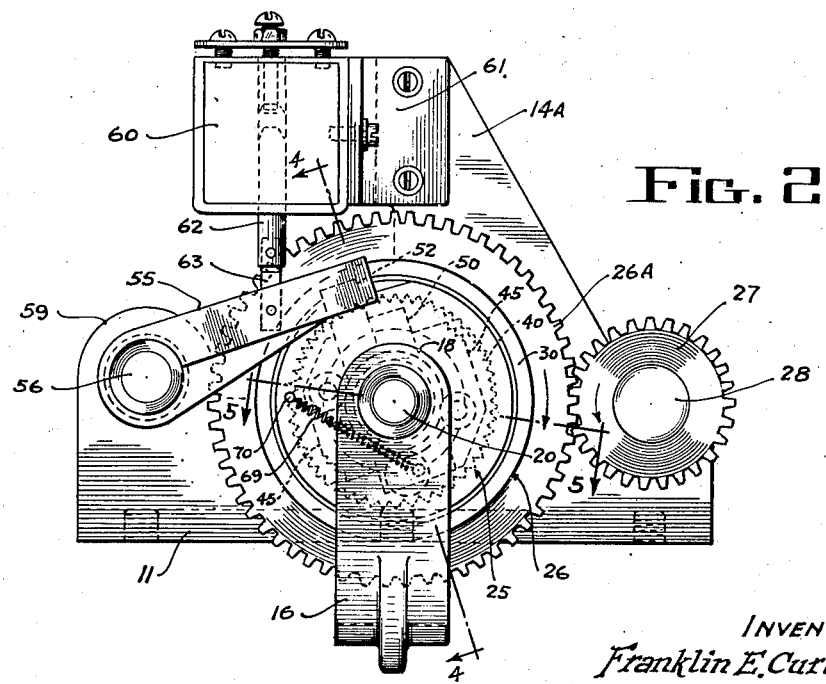
Fig. 2 is an end elevational view of the clutch as viewed from the left in Fig. 1.
Figure 3:
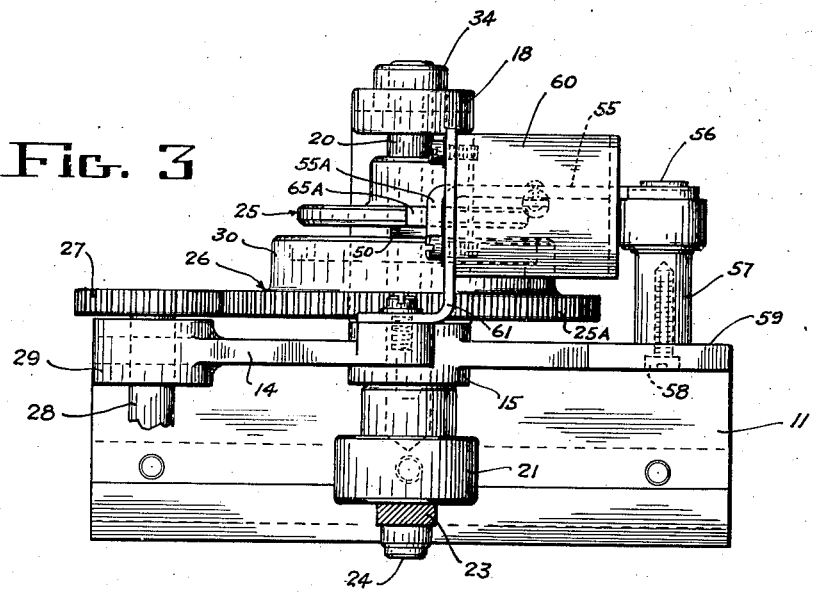
Fig. 3 is a plan view of the clutch shown in Fig. 1.

The clutch 10 has a driven member 25 and a driving member 26 disposed on the shaft 20 between the bearings 15 and 18, the driven member 25 being secured to the shaft 20 while the driving member 26 is freely rotatable on the shaft 20, and hence the shaft 20 is driven only when the driving member 26 is operatively connected to the driven member 25 through the clutch mechanism of the present invention. The driving member 26 of the present invention may be driven by varying or different means, but as herein shown, this member is adapted to be constantly driven through a geared driving connection, and the member 26 is accordingly formed as a part of a gear 26, the teeth of which are illustrated in Figs. 1, 2 and 3 as being engaged with a driving pinion 27 that is fixed on the end of the shaft 28 supported in a bearing 29 afforded as a part of the bracket 11. Thus where the pinion 27 is rotated constantly in a counter-clockwise direction, the driving member 26 of the clutch 10 will be rotated constantly in a clockwise direction as viewed in Fig. 2.

Figure 4:
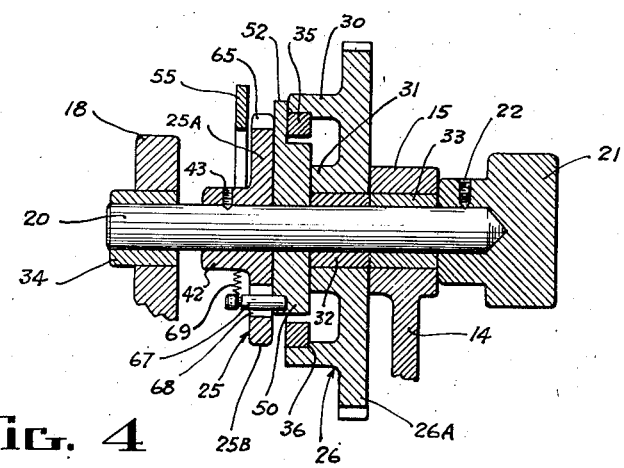
Fig. 4 is a fragmental cross sectional view taken substantially along the line 4—4 of Fig. 2.
Figure 5:
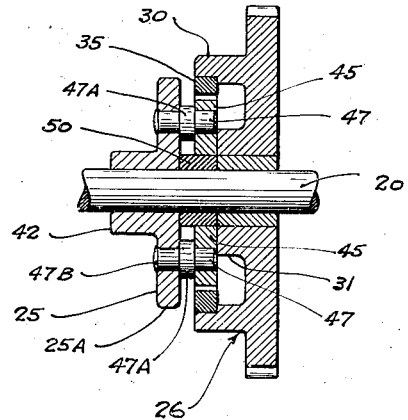
Fig. 5 is a sectional view taken substantially along the line 5—5 of Fig. 2.
Figure 6:
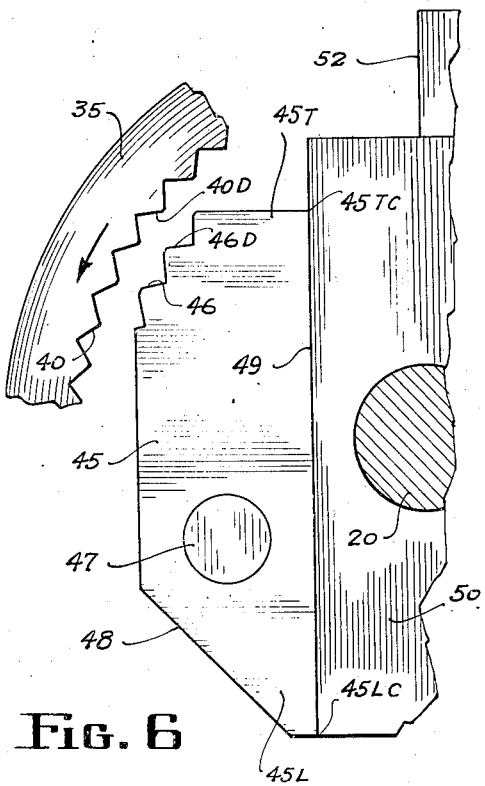
Figs. 6 and 7 are enlarged views showing details of the clutch teeth.
Figure 7:
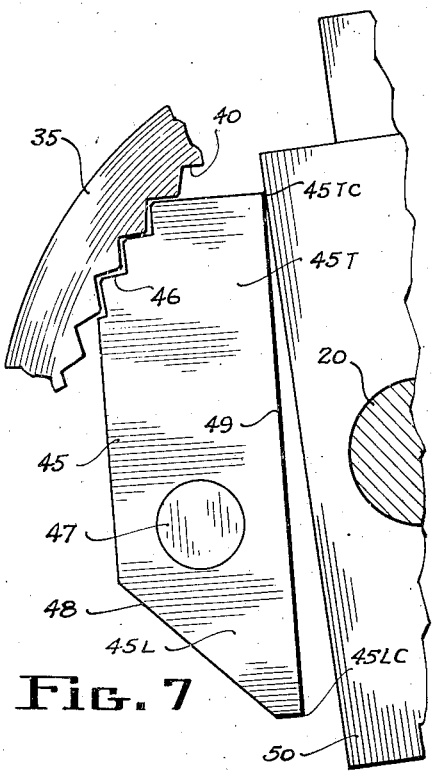

The gear 26A in the present instance affords a disc-like body that has an annular flange 30 formed thereon near its outer edge so as to project from the body of the gear 26A toward the driven member 25 of the clutch, and it will be observed in Figs. 4 and 5 of the drawings that the annular flange 30 is spaced outwardly in a radial direction from the outer surface of an integral hub 31 that is formed on the gear 26A to afford the desired stability of mounting of the driving member 26 upon the shaft 20. In the present instance the hub 31 is mounted upon the shaft 20 through the use of a bearing sleeve 32; and it should be noted that similar bearing sleeves 33 and 34 are utilized at the points where the shaft 20 is supported in the bearings 15 and 18.

The flange 30 projects from the body of the gear in an axial direction for a greater distance than the hub 31, and this added projection of the flange 30 is utilized in the present instance to afford a mounting for a hardened annular ring 35 that is disposed within the flange 30. Thus, as will be evident in Figs. 4 and 5, the flange 30 is internally shouldered as at 36, and the annular ring 35 is inserted into the flange 30 so as to set firmly against the annular shoulder 36, the ring 35 being held against rotation with respect to the flange 30 by suitable fitting or shrinking operations. The ring 35, as shown in Figs. 2 and 5 to 8, is formed to afford a series of internal clutch teeth 40, and these teeth are adapted to be engaged by complemental clutch means that are provided on the driven member 25 of the clutch, as will presently be described in detail. It will be observed that the teeth 40 are relatively small or narrow in a circumferential direction, and it is this small dimension of the teeth 40 that enables quick-pickup characteristics to be attained in the clutch.

The driven member 25 of the clutch is in the present instance in the nature of a disc 25A having an integral hub 42 secured upon the shaft 20 by a set screw 43 so that driving or rotating movement may be transmitted from the disc 25A to the shaft 20. When the clutch member 25 is to be driven from the driving member 26 of the clutch, a pair of clutch dogs 45 mounted on the disc 25A are shifted from the disengaged positions of Figs. 6 and 8 to the engaged positions of Figs. 7 and 9, thereby to engage clutch teeth 46 on the dogs 45 with the clutch teeth 40 of the driving member 26 of the clutch. The clutch dogs 45 are disposed on opposite sides of the axis of the shaft 20, and are pivotally mounted on the disc 25A by mounting studs 47. The studs 47 are secured in place on the disc 25A by riveted ends 47B, and it will be observed in Fig. 5 that the studs 47 are shouldered at 47A so as to dispose the clutch dogs in the space directly inside of the ring 35. In attaining this action the end of the hub 31 acts in opposition to the shoulder 47A to hold the dogs 45 in position on the studs 47. The pivotal mounting or axis that is thus afforded for each of the clutch dogs 45 is disposed intermediate the ends of such clutch dogs, and insofar as the direction of rotation of the clutch may be concerned, the teeth 46 of the clutch dogs 45 are formed adjacent to what may be termed the trailing ends of such clutch dogs, as will be evident in Figs. 6 to 11 of the drawings. Since the ends of the clutch dogs 45 upon which the teeth 46 are formed constitute the trailing ends of such clutch dogs, these trailing ends have been herein designated as 45T, while the leading ends of the clutch dogs have been designated as 45L. The clutch dogs 45 are of relatively simple form and are adapted for manufacture by simple and readily performed machining operations. Thus each clutch dog 45 is formed from a rectangular bar of stock and the clutch teeth 46 are formed at one corner of bar of stock as shown in Figs. 6 to 11 of the drawings. The mounting opening for the supporting stud 47 is, of course, formed in the bar of stock, and in the form herein shown, this mounting opening is so disposed that the end 45T of the clutch dog is somewhat longer than the end 45L. In order that the clutch dog 45 may be made of a relatively great overall length, the end 45L of the clutch dog is cut away at an angle as indicated at 48 in Figs. 6, 8 and 9, thus affording relatively greater length in the end 45L while avoiding interference of this end with the teeth 40 of the driving member 26. When the clutch dogs 45 are thus formed, each clutch dog has a flat side surface 49 that extends throughout the length of the portions or ends 45T and 45L, and the forces required for engaging and disengaging the clutch dogs are applied to the side surfaces 49 of the clutch dogs.

Figure 8:
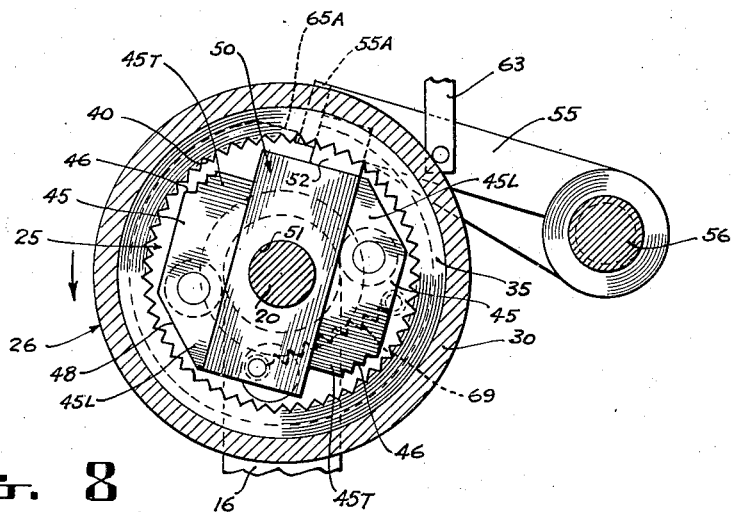
Fig. 8 is a sectional view taken substantially along the line 8—8 of Fig. 1 and illustrating the relationship of the internal parts of the clutch when the clutch is disengaged.
Figure 9:
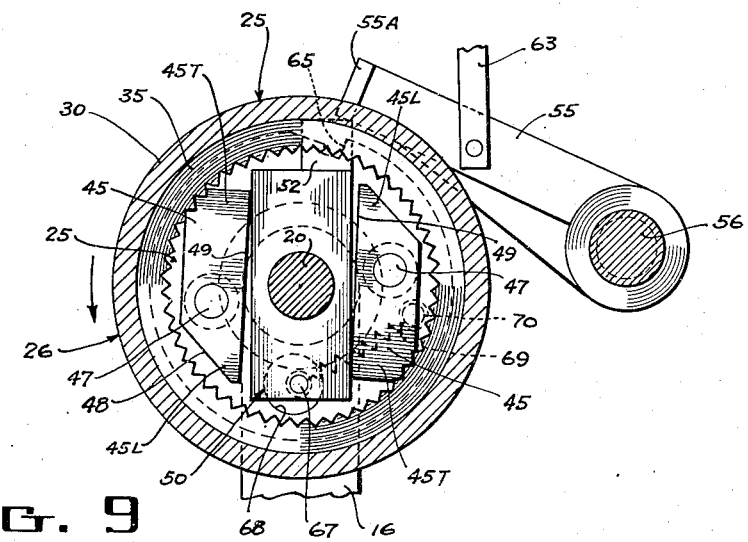
Fig. 9 is a view similar to Fig. 8 and illustrating the relationship of the parts of the clutch just after the clutch engaging elements have been released and been moved into engaging relationships.

In attaining this result, a control member 50 is utilized, this control member 50 being rectangular in form as viewed in Figs. 8 and 9 and having a central opening 51 that surrounds the shaft 20 so as to dispose the control member 50 between the disc 25A of the driven member of the clutch and the end of the hub 31 of the driving member of the clutch, as shown in Figs. 4 and 5. Thus the control member 50 is disposed in part within the ring 35 of the driving member and is disposed in part in the space that is aligned with the shoulders 47A, as will be evident in Fig. 5 of the drawings, and at one of its ends, the control member 50 has an arm 52 that projects outwardly beyond the peripheral edge 25B of the disc 25A, and by engagement of the arm 52, it is possible to hold the control member 50 against rotation.

In the present instance, means are provided for engaging and holding the arm 52 of the control member 50, and such means comprise a stop lever 55 pivoted at 56 on a stationary mounting stud 57 secured by screw 58 to an upstanding web portion 59 of the mounting bracket 11. The stop lever 55 extends from its pivot 56 to a point such that its free end is disposed adjacent to the upward edge of the disc 25A, and the end of the stop lever 55 is bent laterally as at 55A so that when the stop lever is in the position shown in Figs. 10 and 11 it is disposed in the path of the arm 52 of the control member 50. The stop lever 55 is normally urged by gravity to its lower or effective position, and in the present case a solenoid 60 is supported over the lever 55 on a bracket 61 mounted on an upstanding portion 14A of the web 14 so that the armature 62 of the solenoid 60 may be connected by a link 63 to the stop lever 55. Thus, when the solenoid 60 is energized, the stop lever 55 is raised to its released position of Fig. 9, and when this takes place, the control member 50 is released for movement in the direction of rotation of the driving member 26, or in other words in a counter-clockwise direction as viewed in Figs. 8 to 11 of the drawings. When the driven member 25 of the clutch is in its stopped position of Fig. 8, the tooth 55A of the stop lever 55 is disposed within a notch 65 formed in the edge of the disc 25A as will be evident in Figs. 2 and 8 to 11 of the drawings, and it will be recalled that the tooth 55A of the stop lever 55 is also engaged with the leading edge of the arm 52 so that it holds the control member 50 against rotation in a forward or counter-clockwise direction as shown in Fig. 8. When this condition prevails as shown in Fig. 8 of the drawings, the side edges of the control member 50 are engaged with the side edges 49 of the clutch dogs 45 so that these clutch dogs are disposed in their ineffective or disengaging positions. The force necessary for moving the clutch dogs 45 to such disengaged positions is actually applied by engagement of the side edges of the control member 50 with the edges 49 adjacent to the ends 45L of the clutch dogs at substantially the corners 45LC, indicated in Figs. 6 and 7. When the parts are in this relationship of Fig. 8, the control member 50 is constantly and yieldingly urged in an advancing or counter-clockwise direction as viewed in Fig. 8, thereby to tend to move in such a direction as to impart engaging movement to the clutch dogs 45, and such engaging movement would in such an instance be imparted to the clutch dogs by engagement by the sides of the control member with the edges 49 of the clutch dogs adjacent to the ends 45T, at substantially the corners 45TC, indicated in Figs. 6 and 7 of the drawings. Thus upon release of the stop lever 55 a yielding imparted movement of the control member 50 serves to impart clutch engaging movement to the clutch dogs 45.

In the form herein shown, the desired yielding force is applied to the control member 50 through a pin 67 mounted in the control member 50, as shown in Fig. 4, so as to project through an opening 68 in the disc 25A, and the projecting end of the pin 67 has one end of a spring 69 connected thereto. The other end of the spring is extended in a leading direction from the pin 67 and along the adjacent or left hand face of the disc 25A as viewed in Fig. 4, and the other end of the spring 69 is anchored on a pin 70 secured in the disc 25A. Thus the spring 69 is effective to constantly urge the control member 50 in an advancing or counter-clockwise direction from the position shown in Fig. 8 to the position shown in Fig. 9, and when the control member is released, so that such advancing movement of the control member may take place, the movement of the control member serves to impart clutch engaging movement to the clutch dogs 45. As the clutch dogs 45 move from their positions of Fig. 8 toward the positions shown in Fig. 9, the teeth 46 on the trailing ends of the clutch dogs move into the path of the teeth 40 of the driving member of the clutch, and upon engagement of the teeth 40 of the driving member with the teeth 46 of the clutch dogs, the rotating motion of the driving member 26 is transmitted longitudinally of the clutch dogs to the mounting studs 47, thereby to impart rotative movement to the driven member 25 of the clutch.

Figure 10:
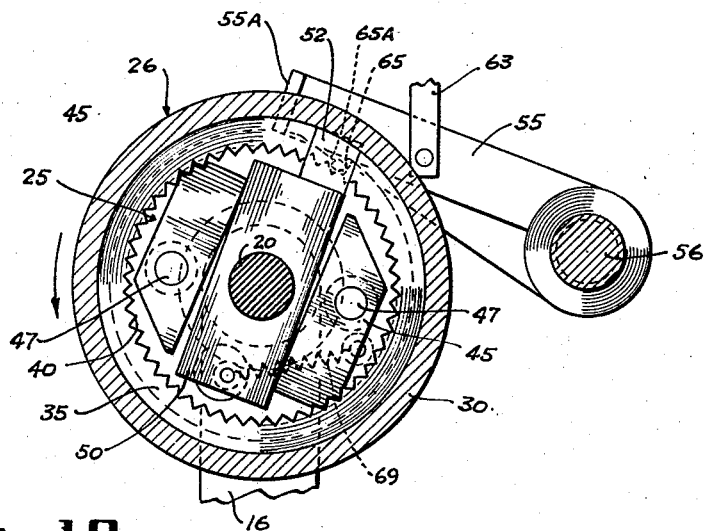
Fig. 10 is a view similar to Fig. 8 and illustrating the relationship of the parts of the clutch as it approaches the point in its rotation where the disengagement is to take place.
Figure 11:
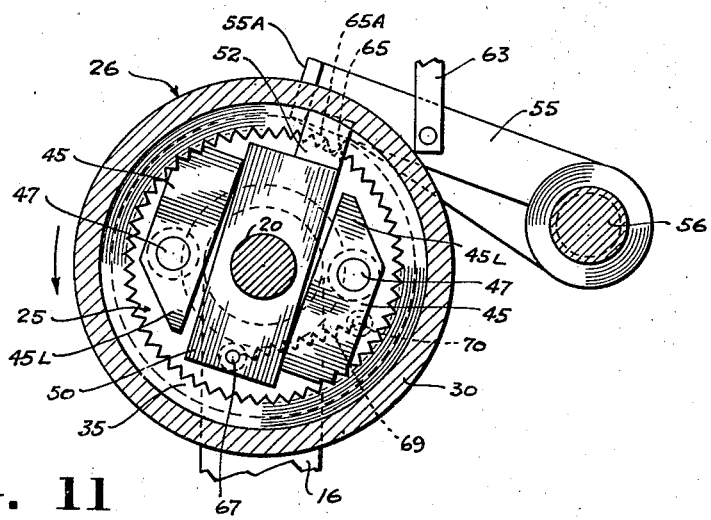
Fig. 11 is a view similar to Fig. 8 and showing the relationship of the parts after the stop lever of the clutch has been engaged and just before the disengaging movement of the parts has started.

Upon the engagement of the clutch as aforesaid, the rotative movement of the driven member 25 of the clutch will continue until such time as the stop lever 55 is rendered effective, and this may be done so as to limit the clutch to a single revolution, or the stop lever 55 may be retained in its ineffective position on Fig. 9 until such time it is desired to release the clutch. When the clutch is to be thus released, the stop lever 55 is allowed to move toward the outer edge of the disc 25A until it rides on this peripheral edge, as shown in Fig. 10, and as the rotative movement of the driven member of the clutch progresses, the arm 52 approaches the tooth 55A of the stop lever as will be evident in Fig. 10. When the arm 52 of the control member 50 engages the tooth 55A of the stop lever, it will be evident that the rotative movement of the control member 50 will be stopped in the relationship shown in Fig. 11. It will be clear however the clutch dogs 45 are still engaged with the teeth 40 of the driving member 26 of the clutch, and hence the rotative movement of the driven member 25 of the clutch will continue in a counter-clockwise direction from the relationship shown in Fig. 11 back to the relationship shown in Fig. 8 of the drawings. In the course of such further rotation of the driven member 25 of the clutch, the end corners 45LC of the clutch dogs 45 will be moved into engagement with the side edges of the control member 50 which is now stationary, and hence, after such engagement has taken place, the continued rotative movement of the driven member 25 of the clutch will cause the leading corners 45LC of each clutch dog 45 to ride along the edge surfaces of the control member, thereby to impart clockwise rotation to the clutch dogs 45 about their pivot studs 47. This of course serves to move the ends 45T of the clutch dogs 45 inwardly away from the teeth 40, thereby to disengage the teeth 46 from the teeth 40. In the course of such further rotative movement of the driven member of the clutch from the relationship shown in Fig. 11 to the relationship shown in Fig. 8, the spring 69 is again tensioned, and after the clutch dogs 45 have been fully disengaged, the tooth 55A of the stop lever drops radially into the notch 65, thereby to stop the driven member in a particular rotative position and prevent retrograde movement of the driven member. In this connection, it should be observed that the leading edge of the notch 65 is cut away as at 65A, thereby to enable the tooth 55A to start its inward radial movement somewhat prior to the time when the notch 65 moves into alignment with the tooth 55A. With this arrangement, the tooth 55A may first be engaged by the trailing edge of the notch 65 to positively stop the forward rotation of the driven member 25 of the clutch, and as an incident to such stopping action may continue its inward radial movement so as to become fully engaged with the notch 65 and thereby prevent retrograde movement of the driven member.

In attaining the desired quick-pickup action in the clutch of the present invention, the teeth 40 on the driving member and the teeth 46 on the clutch dogs 45 are so formed as to facilitate the engaging and disengaging movement of the clutch dogs and to also insure that such clutch teeth may be readily and easily formed by the use of conventional machine tools and conventional machining operations. Thus it will be observed that the faces of the clutch teeth 40 and 46 are formed as substantially flat surfaces that extend transversely of the members in which they are formed, and these surfaces are so formed that the driving faces, or in other words the faces to which the driving forces are applied, are each arranged substantially perpendicular to a radial plane extended from the axis 47 of the clutch dog to each such face. Such driving faces of the clutch teeth 46 have been indicated by the reference character 46D in Fig. 6 of the drawings, and the opposed faces of the teeth 40 have been indicated by the reference character 40D. With this arrangement of the driving faces 40D and 46D, the side faces of the teeth are arranged in substantially radial planes with respect to the adjacent axis 47. Thus when the clutch dog 45 is to be disengaged, which requires movement from the position shown in Fig. 7 to the position shown in Fig. 6, such movement may be accomplished relatively easily, since the surfaces 46D of the clutch dogs 45 are in such an instance moved in planes that are substantially perpendicular to the direction in which force is being transmitted from the faces 40D to the faces 46D. Similarly, in an engaging movement of the clutch dogs 45, the required movements of the clutch dogs are relatively small, and such movements may be accomplished with such speed as to attain substantially full engagement of the teeth prior to the time when the surfaces 40D strike the surfaces 46D. When such striking engagement of the surfaces 40D with the surfaces 46D takes place, it will be observed that the action against each surface 46D is directed toward the axis of the clutch dog through the main body of the clutch dog so that the forces are distributed as compression forces rather than as shearing or tension forces and any tendency to break off the tooth 46 is thereby minimized. Similarly, the application of forces within the ring 35 is such that the reaction through the surface 40D of each tooth is into the main body of the ring and rather than transversely of the tooth. Hence any tendency to break off the tooth 40 is minimized with the construction of the present clutch.

In view of the foregoing description it will be apparent that the present invention provides a quick-pickup clutch that is simple in construction and positive in operation, and this clutch as constructed under the present invention is made from parts or elements that are adapted for manufacture through the use of conventional machine tools and conventional machining operations. Thus the clutch of the present invention possesses quick-pickup characteristics and these characteristics are attained in such a way that a long useful life of the clutch is assured.

Hence, while I have illustrated and described the preferred embodiment of my invention, it is to be understood that this is capable of variation and modification and I therefore do not wish to be limited to the precise details set forth, but desire to avail myself of such changes and alterations as fall within the purview of the following claims.

I claim:

1. In a quick-pickup clutch, a constantly rotating driving member, an annular element on said driving member having an annular series of internal clutch teeth formed thereon concentric with the rotative axis of said driving member, a driven member supported for rotation on an axis concentric with the rotative axis of said driving member, a pair of clutch dogs pivoted on said driven member on axes parallel to and disposed on opposite sides of the rotative axis of said driven member, said clutch dogs having teeth formed thereon adjacent to corresponding ends thereof for engagement with the teeth on said annular element of said driving member, a control member pivoted on said axis of rotation of said driven member between said clutch dogs and operatively associated with said clutch dogs for imparting clutch engaging and disengaging movement to said clutch dogs upon rocking movement of said control member relative to said driven member, spring means acting between said control member and said driven member and tending to rock said control member in one direction with relation to said driven member to impart clutch engaging movement to said clutch dogs, and means on said control member projecting in a generally radial direction beyond said driven member and adapted for engagement to impart rocking movement to said control member in the other direction to thereby disengage said clutch dogs from said driving member.

2. In a quick-pickup clutch, a constantly rotating driving member, an annular element on said driving member having an annular series of internal clutch teeth formed thereon concentric with the rotative axis of said driving member, a driven member supported for rotation on an axis concentric with the rotative axis of said driving member, a pair of clutch dogs pivoted on said driven member on axes parallel to and disposed on opposite sides of the rotative axis of said driven member, said clutch dogs having teeth formed thereon adjacent to corresponding ends thereof for engagement with the teeth on said annular element of said driving member, a control member pivoted on said axis of rotation of said driven member and disposed between said clutch dogs, said control member having side edge surfaces disposed adjacent said clutch dogs, and said clutch dogs each having surfaces on opposite sides of their pivotal axes for engagement by said control member to selectively impart clutch engaging or disengaging movement to said clutch dogs as an incident to rocking movement of said control member relative to said driven member, spring means acting between said control member and said driven member and tending to rock said control member in one direction with relation to said driven member to impart clutch engaging movement to said clutch dogs, and means on said control member projecting in a generally radial direction beyond said driven member and adapted for engagement to cause rocking movement of said control member in the other direction relative to said driven member to thereby disengage said clutch dogs from said driving member.

3. In a clutch of the character described, a constantly rotating driving member, an annular element on said driving member having an annular series of internal clutch teeth formed thereon concentric with the rotative axis of said driving member, a driven member supported for rotation on an axis concentric with the rotative axis of said driving member, a pair of clutch dogs pivoted on said driven member on axes parallel to and disposed on opposite sides of the rotative axis of said driven member, said clutch dogs having teeth formed thereon adjacent to corresponding ends thereof for engagement with the teeth on said annular element of said driving member, a control member pivoted on said axis of rotation of said driven member and disposed between said clutch dogs, spring means acting between said control member and said driven member and tending to rock said control member in one direction with relation to said driven member to impart clutch engaging movement to said clutch dogs, and means on said control member adapted for engagement during rotation of said driven member to impart rocking movement to said control member in the other direction to thereby disengage said clutch dogs from said driving member.

4. In a quick-pickup clutch, a constantly rotating driving member, an annular element on said driving member having an annular series of internal clutch teeth formed thereon concentric with the rotative axis of said driving member, a driven member supported for rotation on an axis concentric with the rotative axis of said driving member, a pair of clutch dogs pivoted on said driven member intermediate their ends on axes parallel to and disposed on opposite sides of the rotative axis of said driven member so as to afford ends on each dog extending in opposite directions from its pivotal axis, said clutch dogs having teeth formed thereon adjacent to corresponding ends thereof for engagement with the teeth on said annular element of said driving member, the driving faces of such teeth of each dog being formed as substantially flat surfaces disposed in planes substantially perpendicular to radial planes extended from the pivotal axis of the dog to each such driving face, and a control member pivoted on said axis of rotation of said driven member between said clutch dogs for rocking movement relative to said driven member and operable to engage corresponding opposite ends of said dogs selectively to impart clutch engaging and disengaging movements selectively to said clutch dogs.

5. In a clutch of the character described, a constantly rotating driving member having an integral annular flange spaced substantially from the axis thereof, a separately formed annular element secured on said driving member having an annular series of internal clutch teeth formed thereon concentric with the rotative axis of said driving member, a driven member comprising a disc supported for rotation on an axis concentric with the rotative axis of said driving member and disposed opposite and in axially spaced relation to the open end of said flange, a pair of clutch dogs pivoted on said disk on axes parallel to and disposed on opposite sides of the rotative axis of said driven member and in the space within said flange, said clutch dogs having teeth formed thereon adjacent to corresponding ends thereof for engagement with the teeth on said annular element of said driving member, a control member pivoted on said axis of rotation of said driven member and disposed between said clutch dogs, said control member having side edge surfaces disposed adjacent said clutch dogs, and said clutch dogs each having surfaces on opposite sides of their pivotal axes for engagement by said control member to selectively impart clutch engaging or disengaging movement to said clutch dogs as an incident to predetermined rocking movement of said control member in one direction or the other relative to said driven member, spring means acting between said control member and said driven member and tending to rock said control member in said one direction with relation to said driven member to impart clutch engaging movement to said clutch dogs, and means on said control member in said space and projecting between said disc and said flange in a generally radial direction beyond said driven member and adapted for engagement to cause rocking movement of said control member in the other direction relative to said driven member to thereby disengage said clutch dogs from said driving member.

6. In a clutch of the character described, a constantly rotating driving member having an integral annular flange spaced substantially from the axis thereof, a separately formed annular element secured on said driving member having an annular series of internal clutch teeth formed thereon concentric with the rotative axis of said driving member, a driven member comprising a disc supported for rotation on an axis concentric with the rotative axis of said driving member and disposed opposite and in axially spaced relation to the open end of said flange, a pair of clutch dogs pivoted on said disc on axes parallel to and disposed on opposite sides of the rotative axis of said driven member and in the space within said flange, said clutch dogs having teeth formed thereon adjacent to corresponding ends thereof for engagement with the teeth on said annular element of said driving member, a control member pivoted on said axis of rotation of said driven member and disposed between said clutch dogs, said control member having side edge surfaces disposed adjacent said clutch dogs, and said clutch dogs each having surfaces on opposite sides of their pivotal axes for engagement by said control member to selectively impart clutch engaging or disengaging movement to said clutch dogs as an incident to predetermined rocking movement of said control member in one direction or the other relative to said driven member, spring means acting between said control member and said driven member and tending to rock said control member in said one direction with relation to said driven member to impart clutch engaging movement to said clutch dogs, an arm on said control member in said space and projecting between said disc and said flange in a generally radial direction beyond said driven member and adapted for engagement to cause rocking movement of said control member in the other direction relative to said driven member to thereby disengage said clutch dogs from said driving member, a stop lever adapted to be moved into the path of said arm to effect such predetermined rocking movement of said control member in said other direction, and said disc having a notch formed therein for engagement by said stop lever when such predetermined rocking movement of said control member in said other direction has been completed to thereby stop said driven member in a predetermined rotative relationship.

7. In a clutch of the character described, a constantly rotating driving member having an integral annular flange spaced substantially from the axis thereof, a separately formed annular element stationarily secured within said flange and having an annular series of internal clutch teeth formed thereon concentric with the rotative axis of said driving member, a driven member comprising a disc supported for rotation on an axis concentric with the rotative axis of said driving member and disposed opposite and in axially spaced relation to the open end of said flange, a pair of clutch dogs pivoted on said disc on axes parallel to and disposed on opposite sides of the rotative axis of said driven member and in the space within said flange, said clutch dogs having teeth formed thereon adjacent to corresponding ends thereof for engagement with the teeth on said annular element of said driving member, a control member pivoted on said axis of rotation of said driven member and disposed between said clutch dogs and operatively associated with said clutch dogs to selectively impart clutch engaging or disengaging movement to said clutch dogs as an incident to predetermined rocking movement of said control member in one direction or the other relative to said driven member, spring means acting between said control member and said driven member and tending to rock said control member in said one direction with relation to said driven member to impart clutch engaging movement to said clutch dogs, an arm on said control member in said space and projecting between said disc and said flange in a generally radial direction beyond said driven member and adapted for engagement to cause rocking movement of said control member in the other direction relative to said driven member to thereby disengage said clutch dogs from said driving member, a stop lever adapted to be moved into the path of said arm to stop rotation of said control member with said driven member and thereby effect such predetermined rocking movement of said control member in said other direction, and said disc having a notch formed therein for engagement by said stop lever when such predetermined rocking movement of said control member in said other direction has been completed to thereby stop said driven member in a predetermined rotative relationship and maintain the same in such relationship.

8. In a clutch of the character described, a constantly rotating driving member having an integral annular flange spaced substantially from the axis thereof, a separately formed annular element secured within said annular flange and having an annular series of internal clutch teeth formed thereon concentric with the rotative axis of said driving member, a driven member comprising a disc supported for rotation on an axis concentric with the rotative axis of said driving member and disposed opposite and in axially spaced relation to the open end of said flange, a pair of clutch dogs pivoted on said disc on axes parallel to and disposed on opposite sides of the rotative axis of said driven member and in the space within said flange, a hub on said driving member engaging said dogs to maintain the dogs on their pivotal supports in an axial sense, said clutch dogs having teeth formed thereon adjacent to corresponding ends thereof for engagement with the teeth on said annular element of said driving member, a control member pivoted on said axis of rotation of said driven member and disposed between said clutch dogs and operatively associated with said clutch dogs to impart clutch disengaging movement to said clutch dogs as an incident to predetermined rocking movement of said control member in one direction relative to said driven member, spring means tending to impart clutch engaging movement to said clutch dogs, and means on said control member in said space and projecting between said disc and said flange in a generally radial direction beyond said driven member and adapted for engagement to cause rocking movement of said control member in said direction relative to said driven member to thereby disengage said clutch dogs from said driving member.

9. In a clutch of the character described, a constantly rotating driving member having an integral annular flange spaced substantially from the axis thereof, a separately formed annular element stationarily secured within said flange and having an annular series of internal clutch teeth formed thereon concentric with the rotative axis of said driving member, a driven member comprising a disc supported for rotation on an axis concentric with the rotative axis of said driving member and disposed opposite and in axially spaced relation to the open end of said flange, a pair of shouldered mounting studs projecting from opposite sides of and parallel to the rotative axis of said driven member and into the space within said flange, clutch dogs mounted on each of the respective studs for pivotal movement on said studs, a hub formed on said driving member and engaging said clutch dogs to hold the same in position on said studs and in engagement with the shoulders of said studs, said clutch dogs having teeth formed thereon adjacent to corresponding ends thereof for engagement with the teeth on said annular element of said driving member, a control member pivoted on said axis of rotation of said driven member and disposed between said clutch dogs and operatively associated with said clutch dogs to impart clutch disengaging movement to said clutch dogs as an incident to predetermined rocking movement of said control member in one direction relative to said driven member, spring means constantly urging said clutch dogs to impart clutch engaging movement thereto, an arm on said control member projecting between said disc and said flange in a generally radial direction beyond said driven member and adapted for engagement to cause rocking movement of said control member in said one direction relative to said driven member to thereby disengage said clutch dogs from said driving member, a stop lever adapted to be moved into engagement with the periphery of said disc so as to thereby lie in the path of said arm to stop rotation of said control member with said driven member and thereby effect such predetermined rocking movement of said control member in said one direction with respect to said driven member, and said disc having a notch formed in the periphery thereof with the leading edge of said notch beveled to thereby expose the trailing edge of the notch for engagement with said stop lever when such predetermined rocking movement of said control member in said other direction has been completed to thereby stop said driven member in a predetermined rotative relationship and maintain the same in such relationship, said notch being somewhat deeper than said beveled leading edge to enable further entry of said stop lever into said notch to prevent retrograde movement of said driven member.

FRANKLIN E. CURTIS.

REFERENCES CITED

The following references are of record in the file of this patent:

UNITED STATES PATENTS

| Number | Name | Date |
| --- | --- | --- |
| 1,032,759 | Maurer | July 16, 1912 |
| 1,396,343 | Richardson | Nov. 8, 1921 |
| 2,143,121 | Cox | Jan. 10, 1939 |
| 2,181,244 | McGrew | Nov. 28, 1939 |